United States Patent

Abrol et al.

(10) Patent No.: US 9,014,945 B2
(45) Date of Patent: Apr. 21, 2015

(54) ONLINE ENHANCEMENT FOR IMPROVED GAS TURBINE PERFORMANCE

(71) Applicant: General Electric Company, Schenectady, NY (US)

(72) Inventors: Sidharth Abrol, Bangalore (IN); David Spencer Ewens, Greer, SC (US); Alan Meier Truesdale, Greensville, SC (US)

(73) Assignee: General Electric Company, Schenectady, NY (US)

( * ) Notice: Subject to any disclaimer, the term of this patent is extended or adjusted under 35 U.S.C. 154(b) by 13 days.

(21) Appl. No.: 13/791,765

(22) Filed: Mar. 8, 2013

(65) Prior Publication Data

US 2014/0257666 A1 Sep. 11, 2014

(51) Int. Cl.
G01M 15/14 (2006.01)
F02C 9/48 (2006.01)
F02C 9/00 (2006.01)
G05B 17/02 (2006.01)
G05B 23/02 (2006.01)

(52) U.S. Cl.
CPC .............. F02C 9/48 (2013.01); *F05D 2260/821* (2013.01); F02C 9/00 (2013.01); *F05D 2260/81* (2013.01); G05B 17/02 (2013.01); G05B 23/0294 (2013.01)

(58) Field of Classification Search
CPC ..................................................... G06F 17/18
USPC .............. 701/100; 73/862.331; 324/160, 174; 60/737, 773, 793; 702/179, 185
See application file for complete search history.

(56) References Cited

U.S. PATENT DOCUMENTS

| 6,463,380 | B1 | 10/2002 | Ablett et al. |
|---|---|---|---|
| 6,823,675 | B2 * | 11/2004 | Brunell et al. ................. 60/773 |
| 7,392,713 | B2 * | 7/2008 | Barkhoudarian ........ 73/862.331 |
| 7,853,392 | B2 * | 12/2010 | Healey et al. ................. 701/100 |
| 8,516,829 | B2 * | 8/2013 | Ewens et al. ..................... 60/793 |
| 8,639,480 | B2 * | 1/2014 | Arnold et al. ..................... 703/2 |
| 2008/0140352 | A1 | 6/2008 | Goebel et al. |
| 2008/0234994 | A1 | 9/2008 | Goebel et al. |
| 2009/0056335 | A1 * | 3/2009 | Myers et al. ..................... 60/737 |
| 2011/0265487 | A1 | 11/2011 | Gauthier et al. |
| 2012/0072194 | A1 * | 3/2012 | Arnold et al. ..................... 703/7 |
| 2012/0078567 | A1 * | 3/2012 | Ewens et al. ................. 702/130 |
| 2013/0046507 | A1 * | 2/2013 | Vega Paez et al. ............ 702/179 |

OTHER PUBLICATIONS

PCT Search Report and Written Opinion issued in connection with corresponding Application No. PCT/US2014/012886 on Jun. 5, 2014.

* cited by examiner

*Primary Examiner* — Thomas G Black
*Assistant Examiner* — Wae Louie
(74) *Attorney, Agent, or Firm* — Fletcher Yoder, P.C.

(57) ABSTRACT

A system is provided that includes a memory storing a turbomachinery degradation model configured to model degradation of a turbomachinery over time. The system also includes a controller communicatively coupled to the memory and configured to control the turbomachinery based on a feedback signal and the turbomachinery degradation model. Moreover, the turbomachinery degradation model is configured to use a target power to derive a control parameter by estimating a modeled power of the turbomachinery, and the controller is configured to use the control parameter to control the turbomachinery.

20 Claims, 3 Drawing Sheets

ONLINE ENHANCEMENT FOR IMPROVED GAS TURBINE PERFORMANCE

BACKGROUND

The subject matter disclosed herein generally relates to turbine engines, and more specifically, to systems and methods for prioritizing certain turbine operational objectives.

Turbine engines generally include a compressor, a combustor, and a turbine. The compressor compresses air from an air intake, and subsequently directs the compressed air to the combustor. In the combustor, the compressed air received from the compressor is mixed with a fuel and is combusted to create combustion gases. The combustion gases are directed into the turbine. In the turbine, the combustion gases flow against and around turbine blades of the turbine, thereby driving rotation of the turbine and any external load. The external load may include an electrical generator. As the turbine engine operates, components may degrade and/or foul, resulting in reduced performance over the life of the system. The reduced performance may be in the form of reduced turbine engine output and/or efficiency and increased operating costs.

BRIEF DESCRIPTION

In one embodiment, a system includes a memory storing a turbomachinery degradation model configured to model degradation of a turbomachinery over time. The system also includes a controller communicatively coupled to the memory and configured to control the turbomachinery based on a feedback signal and the turbomachinery degradation model. Moreover, the turbomachinery degradation model is configured to use a target power to derive a control parameter by estimating a modeled power of the turbomachinery. Furthermore, the controller is configured to use the control parameter to control the turbomachinery.

In another embodiment, a method includes storing a turbomachinery degradation model in a memory. The turbomachinery degradation model is configured to model degradation of a turbomachinery over time. The method also includes receiving a feedback signal from one or more sensors. The method further includes receiving a target power. Additionally, the method includes deriving a control parameter by estimating a modeled power of the turbomachinery using the turbomachinery degradation model and the target power. The method also includes transforming the control parameter to a modeled adjustment. Furthermore, the method includes controlling the turbomachinery using the modeled adjustment.

In another embodiment, a controller includes at least one processor and instructions stored on a non-transitory, computer readable medium. The instructions cause the controller to access a turbomachinery degradation model in a memory, wherein the turbomachinery degradation model is configured to model degradation of a turbomachinery over time. The instructions also cause the controller to receive a feedback signal from one or more sensor and a target power. Additionally, the instructions cause the controller to derive a control parameter by estimating a modeled power of the turbomachinery using the turbomachinery degradation model and the target power. The instructions further cause the controller to transform the control parameter to a modeled adjustment. The instructions also cause the controller to transform the control parameter to a modeled adjustment. Furthermore, the instructions cause the controller to control the turbomachinery using the modeled adjustment.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
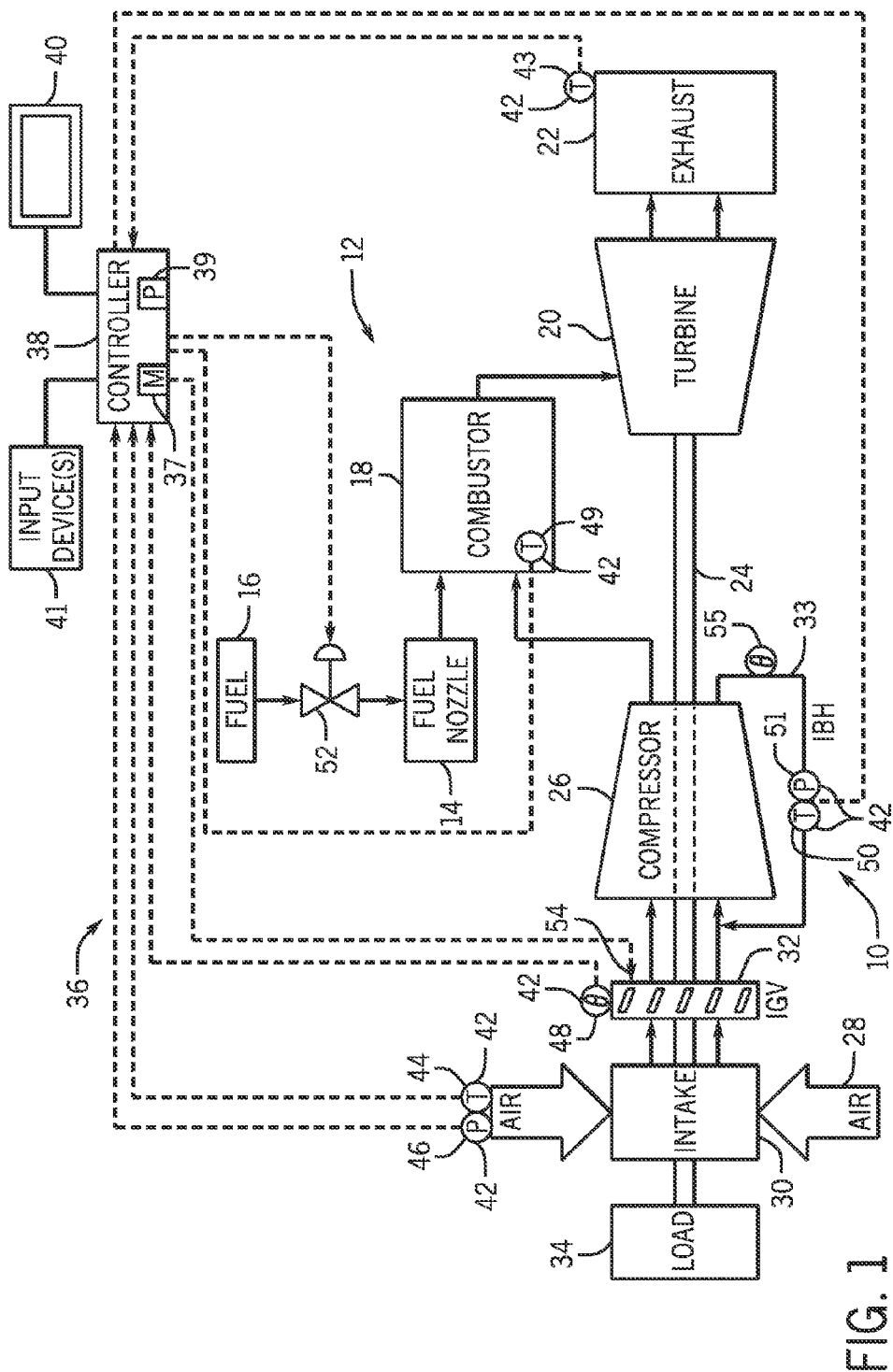
FIG. 1 illustrates a block diagram view of an embodiment of a turbine system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, the disclosed embodiments provide systems and methods for prioritizing between multiple objectives in operating a turbine system. In a new and clean state, the turbine engine typically produces the most favorable outputs, which may be referred to as a base output values. To preserve turbine engine efficiency and cost effectiveness, it may be desirable to maintain operation of the turbine engine at, or approximately at, the base output value(s) or some other target output value(s). For example, in some embodiments, a part load may be maintained to counter degradation effects. However, at some times, it may be desirable to lower engine efficiency to preserve parts, reduce emissions, and/or other factors. To achieve these objectives, at least one corrective parameter may be applied to achieve one or more prioritized objectives based on various related factors. The target output value may be maintained or varied by adjusting at least one operating parameter of the turbine engine based on prioritized objectives.

For example, target output values may include a target power output, a target heat rate, or a combination thereof. The power output of the turbine engine may be electrical power output created as the shaft rotates and may be measured in (Mega)Watts. The heat rate of the turbine is similar to an efficiency measurement, as it compares the energy value of fuel going into the turbine to power output by the turbine (e.g., heat rate is equal to the fuel flow rate multiplied by the fuel heating value and divided by the power output of the turbine). Further, adjustable control parameters may include a firing temperature, an exhaust temperature, a fuel flow rate, a fuel composition (e.g., one or more fuel types), a fuel heating value, an oxygen content of oxidant (e.g., air, oxygen enriched air, oxygen reduced air, or pure oxygen), a fuel-air ratio, a fuel temperature, an emissions flow rate, an inlet guide vane angle, another suitable parameter, or a combination thereof. In certain embodiments, the adjustments may be made using a prioritized list of objectives (e.g., fuel efficiency, target power, etc.). For example, in some embodiments, if replacement of a given turbine engine component is scheduled prior to the end of the product life of other turbine engine components, the operating conditions of the turbine engine may be adjusted such that the output value exceeds the base output target value. This benefit gain would be at the expense of shortening the life of the other turbine engine components, to maximize component life utilization on several turbine components and allow replacement of several components at the same time. In other embodiments, the power output by the turbine may be reduced in order to preserve life of certain components of the turbine and extend the time allowed before a required shutdown and replacement of the given turbine component(s).

Turning now to the drawings, FIG. 1 illustrates a block diagram of an embodiment of a turbine system 10 (e.g., turbomachinery) having a turbine engine 12. In some embodiments, the turbine system 10 may include a gas turbine, a steam turbine, a hydroturbine, and/or other similar turbine systems. As discussed below, the system 10 includes a control system 36 configured to monitor and control aspects of the turbine engine 12 to achieve multiple objectives, counter degradation/performance loss, and/or specifically maintain desired load output, heat rate, and/or various other outputs in response to monitored feedback. The turbine system 10 may use liquid or gaseous fuel, such as natural gas and/or a synthetic gas (e.g., syngas), to drive the turbine system 10. As depicted, in some embodiments, one or more fuel nozzles 14 may intake a fuel supply 16. Each fuel nozzle 14 then mixes the fuel with an oxidant (e.g., air) and may distribute the fuel-air mixture into a combustor 18. In certain embodiments, the fuel from the fuel supply 16 may be mixed with air prior to entering the turbine system 10 (e.g., pre-mixed fuel). Multiple combustors 18 may be arranged circumferentially about the turbine engine 12. Further mixing occurs between the fuel and air within the combustors 18. Although shown schematically as being outside or separate from the combustors 18, the fuel nozzles 14 may be disposed inside the combustors 18. The fuel-air mixture combusts in a chamber within the combustors 18, thereby creating hot, pressurized combustion gases. The combustors 18 direct the combustion gases through a turbine 20 and toward an exhaust outlet 22. As the combustion gases pass through the turbine 20, the gases force blades within the turbine 20 to rotate a shaft 24 along a longitudinal axis of the turbine system 10.

As illustrated, the shaft 24 is connected to various components of the turbine system 10, including a compressor 26. The compressor 26 also includes compressor blades coupled to the shaft 24. As the shaft 24 rotates, the compressor blades within the compressor 26 also rotate, thereby compressing air 28 from an air intake 30. The air intake 30 may feed the air 28 through a series of inlet guide vanes (IGVs) 32, which control the amount of air 28 that is conveyed into the compressor 26. In some embodiments, the air 28 may include a pre-mixed fuel, nitrogen, ambient air, other suitable fluids, or a combination thereof. The IGVs 32 may be disposed at an angle that can be increased or decreased to allow less or more air 28 into the compressor 26. Additionally, the turbine system 10 may include an adjustable Inlet Bleed Heat (IBH) channel 33 that may be used to redirect a portion of the compressed air from an outlet of the compressor 26 and/or exhaust 22 to the inlet of the compressor 26. In certain embodiments, this redirected air may be somewhat warmer than ambient air taken in at the compressor 26. Accordingly, the redirected air may heat the ambient air and cause the air to expand thereby reducing the air flowed through the system and enabling the turbine system 10 to operate at a part load with or without the assistance of an IGV 32 angle change. Additionally, in some embodiments using pre-mixed fuel, the IBH channel 33 may be used to dilute a concentration of fuel in the air 28. The shaft 24 may also be coupled to a load 34, which may be a vehicle or a stationary load, such as an electrical generator in a power plant or a propeller on an aircraft, for example. The load 34 may include any suitable device capable of being powered by the rotational output of turbine system 10.

The control system 36 may be used to control the operation of the turbine engine 12 to increase the operating efficiency or output power of the turbine system 10. For example, the control system 36 may be used to monitor and adjust various parameters of the turbine engine 12. The controller 38 may also communicate with multiple sensors 40 to monitor aspects of the turbine engine 12. In certain embodiments, the controller 38 may include an industrial controller 38, such as a double or triple redundant controller with 2, 3, or more processors 39. For example, the processors 39 may include general-purpose or application-specific microprocessors. Particularly, in some embodiments, a controller 38 may include any suitable computing device, such as a desktop computer or server. Likewise, the memory 37 may include volatile and/or non-volatile memory, random access memory (RAM), read only memory (ROM), flash memory, hard disk drives (HDD), removable disk drives and/or removable disks (e.g., CDs, DVDs, BluRay disks, USB pen drives, etc.), or any combination thereof. Additionally, in certain embodiments, the turbine system 10 may include a display 40. In some embodiments, the display 40 may be integrated into (e.g., mobile device screen) or separate from (e.g., distinct monitor display) the controller 38. As discussed below, the display 40 may be used to present information to a user that enables the user to select various objectives using a graphical user interface. Additionally, the turbine system 10 may include one or more input devices 41 that receive selections of choices from one or more users. In certain embodiments, the input devices 41 may include mice, keyboards, touch screens, trackpads, or other input devices for receiving inputs to the controller 38.

Regardless of the specific components, instructions stored on the memory 37 may be designed to carry out various monitoring, analysis, display menu functions, and control functions of the disclosed embodiments. In the depicted embodiment, the controller 38 may interact with the sensors 42, which include an exhaust temperature sensor 43, an ambient air temperature sensor 44, an ambient air pressure sensor 46, an IGV angle sensor 48, a firing temperature sensor 49, an IBH temperature sensor 50, and/or an IBH air flow sensor 51. Instead of sensors, models may be used to estimate measurable quantities based on one or more sensor inputs. Further, the controller 38 may interact with an actuated valve 52 an IGV actuator 54, an IBH actuator 55, and/or other actuators to adjust operation of the turbine engine 12, as described in detail below.

Figure 2:
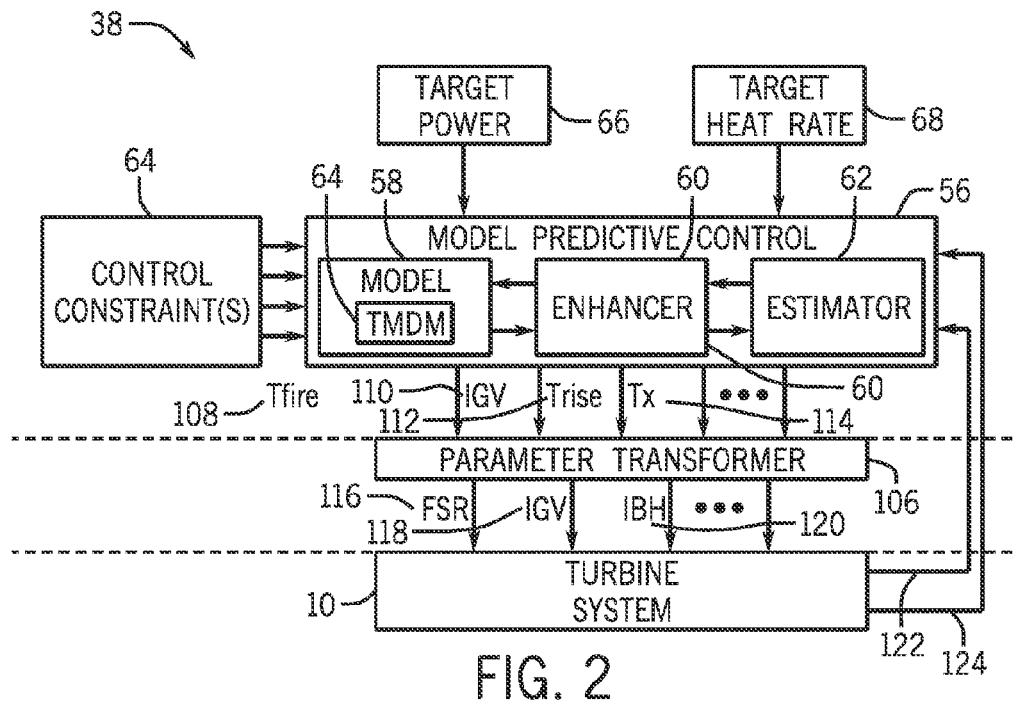
FIG. 2 is a flow diagram view of an embodiment of a controller that may be used to control the turbine system of FIG. 1.

FIG. 2 is a flow diagram of a control process for controlling a turbine system 10 utilizing a model predictive control (MPC) 56. As illustrated, the model predictive control 56 includes a model unit 58, an enhancer unit 60, and an estimator unit 62. In certain embodiments, one or more of the components of the MPC 56 may be stored in the memory 37 and/or executed by the processor 39. In other embodiments, components of the model predictive control 56 may be stored in memory remote from the controller 38 and/or executed by a processor separate from the controller 38. The controller 38 also receives one or more control constraints 64, a target power 66, and/or a target heat rate 68. The control constraints 64 may be received from the input devices 41. In certain embodiments, the control constraints 64 may include enhancing various aspects (e.g., fuel efficiency, produced power, extended life of parts). Additionally or alternatively, various restraints may be input into the controller 38 via the control constraints 64. For example, the control constraints 64 may include a time to outage, a maintenance interval, emissions goals (e.g., reduce certain emissions, such as oxides of nitrogen, carbon monoxide, etc.), fuel cost, and/or other suitable constraints. In some embodiments, these constrains may be received from a user (e.g., via the input device 41) or electronically (e.g., receive fuel cost from a remote resource, such as a server.

In certain embodiments, the model 58 may include a turbomachinery degradation model (TMDM) 64 that models degradation of various components of the turbine system 10, such as estimating components/part life online in real time. In some embodiments, the TMDM 64 may be a model integrated into the model 58 indistinct from the model 58, such that the model 58 is basically the TMDM 64 as well. In other embodiments, the TMDM 64 and the model 58 may be distinct components using similar or different modeling types. For example, in some embodiments, the TMDM 64 and/or the model 58 may be a physics-based model that simulates one or more functions of the turbine system 10 to calculate various parameters used to produce an amount of power and/or heat rate. For example, in some embodiments with a physics-based TMDM 64, the modeling of the TMDM 64 may be based at least in part on the total online time (e.g., overall time of operation) of the turbine system 10 that models a loss of efficiency that occurs from an amount of tracked online time. In certain embodiments, this tracked online time may be reset upon maintenance of the turbine system 10. Additionally, in some embodiments with a physics-based model 58, modeling may be based at least in part on various operating parameters (e.g., IGV angles) of the turbine system 10. In certain embodiments, the TMDM 64 and/or model 58 may include an empirical model with expected responses from various measured parameters (e.g., IGV angles) and operating conditions (e.g., ambient temperature, online time). In other embodiments, the model 58 and/or TMDM 64 may include one or more AI modules (e.g., expert system models), heuristic models, or other suitable models that may be used to simulate the effects on a model overtime as well as other various operating conditions and control parameters.

In some embodiments, the TMDM 64 may include a degradation model that is adapted based on measured inputs (e.g., firing temperature, etc.) such that the TMDM 64 emulates one or more portions of the turbine system 10 under measured conditions. Moreover, certain embodiments of the TMDM 64 may be used to estimate a current state of degradation and/or predict a required adjustment to maintain a target parameter. For example, the TMDM 64 may estimate a current state of degradation for at least one component of the turbine system 10 based on a number of "fired hours" for the at least one component. In other words, the TMDM 64 may estimate the degradation of the component based on previous use of the component. In certain embodiments where the TMDM 64 is used to predict a required adjustment to maintain a target parameter, the TMDM 64 may track the efficiency of at least one component of the turbine system 10 (e.g., compressor 26) and determine what adjustment needs to be made to maintain the output of the at least one component.

Figure 3:
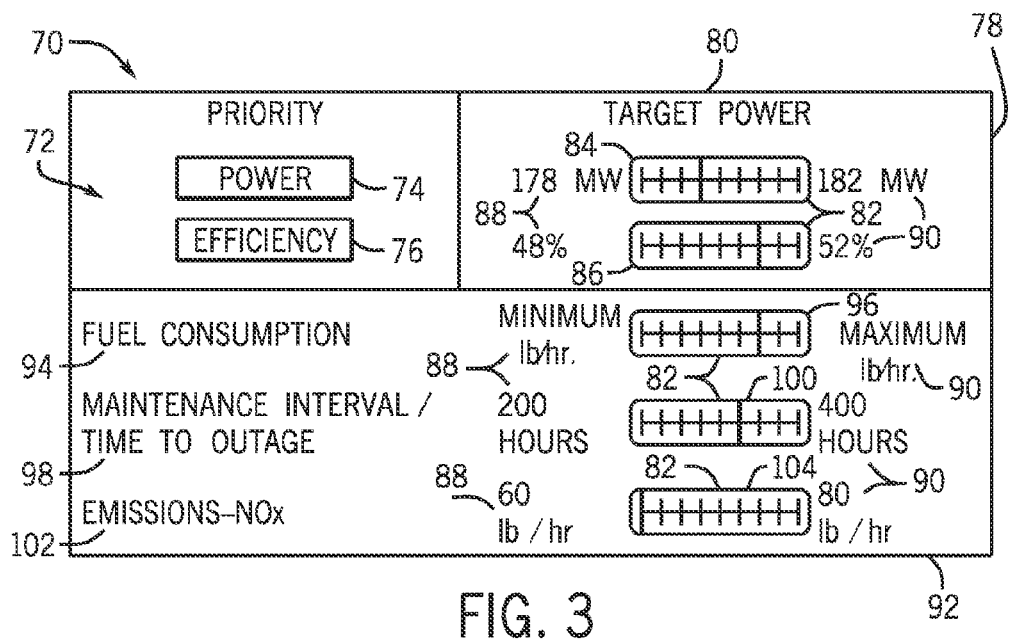
FIG. 3 is a graphical view of graphical user interface that may be used to manage the controller of FIG. 2.

In certain embodiments, an operator may be given the option to choose between constraints and operating modes according to a prioritized mode. A graphical user interface (GUI) 70, such as the embodiment illustrated in FIG. 3, may be presented to a user via the display 40. As illustrated, the GUI 70 includes a prioritization menu 72 which enables a user to select between and prioritize various objectives within the turbine system 10. For example, some embodiments of the prioritizing menu 72 include a power prioritization button 74 and an efficiency prioritization button 76. In some embodiments, the prioritization menu 72 may further include other buttons such as a heat rate prioritization button or a new unit button that cause the controller 38 to operate the turbine system 10 in a manner that attempts to achieve a base load of a "new and clean" turbine system. In some embodiments having power prioritization button 34, the power prioritization button 34 causes the controller 38 to prioritize the power of the turbine system 10 above other factors. In some embodiments, a selection of the power prioritization button 34 causes the controller 38 to cause the turbine system 10 to enter into a power mode in which the turbine system 10 attempts to produce a power demanded by the load 34 and/or selected as the target power 66 by the operator.

Additionally or alternatively, the GUI 70 may include a target menu 78. In some embodiments, upon selection of the power prioritization button 34, the target menu 78, may change to an appropriate display for the selected button in the prioritization menu 72 having an appropriate title 80 and/or one or more value selectors 82. In some embodiments, the value selectors 82 may include sliders, data entry fields, dials, or other GUI elements suitable for enabling the selection of numerical values. For example, if the power prioritization button 74 is selected, the title 80 may display a "Target Power." Additionally, upon selection of the power prioritization button 74, the value selectors 82 may be displayed as a power output selector 84 and/or a efficiency output selector 86. In some embodiments, the power output selector 84 enables the selection of a specified target power (e.g., 179.5 MW), and the efficiency output selector 86 enables the selection of a percentage of the efficiency (e.g., heat rate) of the turbine system 10 (e.g., 51%). In some embodiments, as one value selector 82 within the target menu 78 is adjusted, related value selectors 82 may be adjusted similarly. For example, if the power output selector 84 is used to select 179.5 MW, the power output selector 86 may be automatically adjusted to a corresponding value (e.g., 51%). Additionally, a minimum limit 88 and/or a maximum limit 90 may be changed when a change to one value selector 82 may cause another value selector 82 to exceed its respective minimum limit 88 or maximum limit 90. For example, if the power output selector 84 is adjusted to 182 MW, a respective change to the efficiency output selector 86 may require more or less than 52%. In such embodiments, the efficiency the maximum limit 90 may be increased to compensate for such changes. Additionally, in certain embodiments, when the maximum limit 90 is increased, the minimum limit 88 may be equally adjusted so that the value selector 82 refers to a constant range size (e.g., 4%).

The GUI 70 may also include an efficiency menu 92 that includes one or more value selectors 82 that each corresponds to a control restraint to be transmitted to the controller 38. For example, the efficiency menu 92 may include a fuel efficiency constraint 94, a maintenance interval/time to outage constraint 96, an emissions constraint 98, a regulatory constraint, an economic constraint, and/or other suitable constraints (e.g., fuel cost constraint that is received from an operator or a remote resource/subscription service) on the operation of the turbine system 10. As discussed above, upon selection of the power prioritization button 76, the power output is prioritized. Accordingly, upon the selection of the power prioritization button 76, the value selectors 82 in the efficiency menu 92 receive less priority than those in the target menu 78. For example, in some embodiments, the capability of adjusting these constraints may be limited to values that enable the target power 66 to be achieved. In other words, the remaining objectives may be manipulated and/or prioritized. For example, in some embodiments, after a prioritized objective is selected a lower tiered priority may be assigned to a remaining objective a desired level of prioritization has been achieved or no unprioritized objectives remain. In certain embodiments, manipulation of the efficiency menu 92 by a user may be blocked when the power prioritization button 76 is selected. However, in various embodiments, value selectors 82 in the efficiency menu 92 may be adjusted according to relative changes in the target menu 80. Although the above discussion relates to the target power 66, the target heat rate 68 or any other turbine output objective may be substituted in discussion to enable to selection of a heat rate range and/or temperature for various parts of the turbine system 10 that may be measured/determined using the sensors 42.

If the efficiency prioritization button 76 is selected instead of the power prioritization button 76, the turbine system 10 may enter into one of multiple efficiency modes, such as a preservation mode, an emissions mode, fuel conservation mode, or other modes according to the selection of values using the value selectors 82 in the efficiency menu 92. Additionally, each mode may be selected by a corresponding input selector 82. For example, a fuel consumption control 94 may include a fuel consumption value selector 96 that may be selected. Upon selection of the fuel consumption value selector 96, the turbine system 10 may enter a fuel preservation mode that prioritizes the preservation of fuel above other objectives. In the fuel preservation mode, the controller 38 may constrain the turbine system 10 to operate within parameters that the controller 38 determines will achieve the fuel conservation target selected via the fuel efficiency value selector 96, such that other value selectors 82, minimum limits 88, and/or maximum limits 90 are adjusted within range of the values that the MPC 56 determines will achieve the prioritized objective (e.g., fuel efficiency). Subsequently, in certain embodiments, remaining objectives may be prioritized above other remaining objectives as long as all higher priority objectives are achieved.

The efficiency menu 92 may also include a maintenance interval control 98 that has a maintenance interval selector 100 corresponding to maintenance interval/time to outage. Upon selection of the maintenance interval selector 100, the turbine system 10 may enter into a preservation mode that operates the turbine system 10 at a level that is intended to insure that various components of the turbine system 10 are preserved until the next scheduled maintenance. For example, as discussed below, the turbine system 10 may use TMDM 64 to determine an estimated life of one or more components of the turbine system 10 depending on which mode of operation the turbine system 10 has been operated during an online time of the component. In some embodiments, the estimated remaining life of various components may be displayed in the GUI 70 or separate from the GUI 70. For example, the maintenance interval input selector 100, the minimum limit 88, and/or the maximum limit 90 corresponding to the maintenance interval/time to outage may be adjusted according to an estimated life of one or more components within the turbine system 10. Accordingly, upon selection of a value in the maintenance interval input selector 100, the controller 38 may constrain the turbine system 10 to operate within parameter that the controller 38 determines will preserve the relative components of the turbine system 10 until the time to outage selected in the maintenance interval value selector 100.

The efficiency menu 92 may further include an emissions constraint 102 that has an emissions value selector 104 that may be selected to cause the turbine system 10 to enter into an emissions mode. When in emissions mode, the controller 38 may constrain the turbine system 10 to operate within parameters that the controller 38 determines will achieve the emissions target selected via the emissions value selector 104.

When any of the value selectors 82 are adjusted in the target menu 80 and/or efficiency menu 92, minimum limits 88 and/or maximum limits 90 may be adjusted according to the value set. Additionally, various value selectors 82 may be adjusted according to the selection of one value selector 82 as the prioritized objective. For example, when the efficiency prioritization button 76 is selected and a value is subsequently selected on the fuel efficiency value selector 96, the power output value selector 84 and corresponding limits 88, 90 may be adjusted to values that may produce the selected fuel efficiency using the controller 38. In other words, by prioritizing a target power/heat, the values in the efficiency menu 92 are limited by the selected power/heat, and by prioritizing an efficiency goal, the values in the target menu 80 are limited by the selected efficiency goal. Furthermore, other prioritized objectives may be selected and prioritized above all other objectives other than previously prioritized objectives. The prioritization of objectives may continue until a desired level of prioritization has been achieved or no further objectives remain to prioritize.

Returning to FIG. 2, the MPC 56 receives the model 58, the control constraints 64, the target power 66, and/or the target heat rate 68 to adjust control parameters to achieve the target power heat 66, target heat rate 68, and/or control constraints 64. In some embodiments, the control parameters may include a firing temperature in the combustor, an IGV angle, a temperature rise, an exhaust temperature, and/or other suitable control parameters. The MPC 56 uses the control parameters to estimate effects on various efficiency/power factors (e.g., target power 66, fuel efficiency, online time, etc.) that would result from an adjustment to the control parameters by using the model 58. The MPC 56 also uses an embedded estimator 62 to tune the model 58 to match performance of the turbine system 10 and/or estimate unmeasured model states using various techniques, such as Kalman filtering. These estimated values may be used by the controller 38 to cause the adjustment of the minimum limit 88, maximum limit 90, and/or the value selectors 82 in the GUI 70. These estimated values may also be passed to the enhancer 60 that may determine the enhanced values of that enhance the efficiency of the turbine system 10 resulting from adjustments to the control parameters. In other words, the enhancer unit 60 may further optimize the efficiency of the turbine system 10. These enhanced control parameters are then passed to the parameter transformer 106 to transform/add the parameter to other control parameters. In some embodiments, the parameter transformer 106 may include an existing or current controller, such as those available from General Electric of Schenectady, N.Y. In such embodiments, the MPC 56 may calculate a bias that is then added to the inputs of the existing or current controller for operating the turbine system 10. In various embodiments, a firing temperature parameter 108, an IGV parameter 110, a rise in temperature parameter 112, a temperature of exhaust 112, and/or other control parameters may be supplied to the parameter transformer 106 for transformation adjustments to one or more systems of the turbine system 10. In some embodiments, the control parameters may be transformed into a fuel stroke reference (FSR) adjustment 116, an IGV vane adjustment 118, an IBH system adjustment 120, and/or other suitable system adjustments. The controller 38 then supplies these adjustments to the turbine system 10. Furthermore, the model predictive control 56 may receive one or more temperature measurements 122 and/or a power measurement 124 that is determined using the sensors 42 of the turbine system 10.

Figure 4:
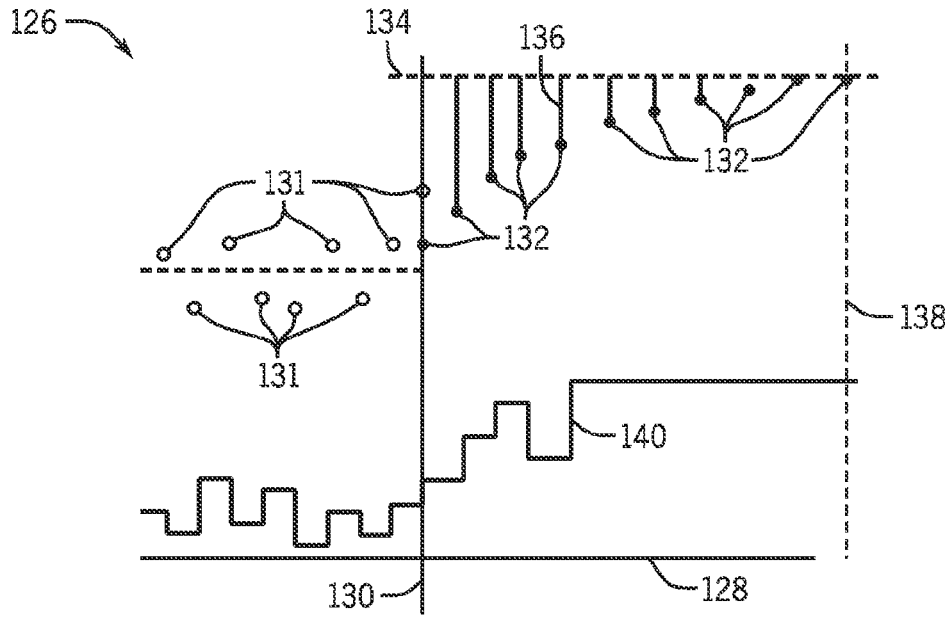
FIG. 4 is a graphical view of an embodiment of model adjustment that may be used in the controller of FIG. 2.

When these measurements 122, 124 vary from expected values, the MPC 56 may use these measurements 122, 124 to adjust the model 58, enhancer 60, estimator 62, and/or the parameter transformer 106 to reduce differences between the expected values and the measured values. For example, FIG. 4 illustrates a graph 126 illustrating the manipulation of the MPC 56. The graph 126 includes an abscissa 128 that represents the passage of time and an ordinate 130 that represents numerical values (e.g., power or heat rate). Additionally, the graph 126 includes multiple measured data points 132 occurring before a change of the target power 66 or target heat rate 68. In some embodiments, these past measurements may be the measurements 122, 124. Moreover, the graph 126 also includes multiple future predicted responses 132. Additionally, the graph 126 includes a target value 134 for future predicted responses and desired time 138 to achieve the target value. Additionally, the graph 126 illustrates an error 136 that is the numerical difference between the target value 134 and the measured data point 132. The MPC 56 then determines a sequence of control moves so that the predicted response 131 moves toward the target value 134 in a desired manner. A calculation is performed at each step (e.g., sampled time). Additionally, the MPC 56 factors in a control horizon (M), a prediction horizon (p), and relative weights of manipulated variables 140. For example, the manipulated variable 140 may include the control parameters previously discussed (e.g., IGV, temperature rise, firing temperature, exhaust temperature, and/or other manipulatable parameters. Additionally, various aspects of the manipulated variables 140 may be adjusted such as a maximum value and/or bias of each of the manipulated variables 140. Additionally, the control moves may be calculated based on the prioritized objectives set in the GUI 70.

Figure 5:
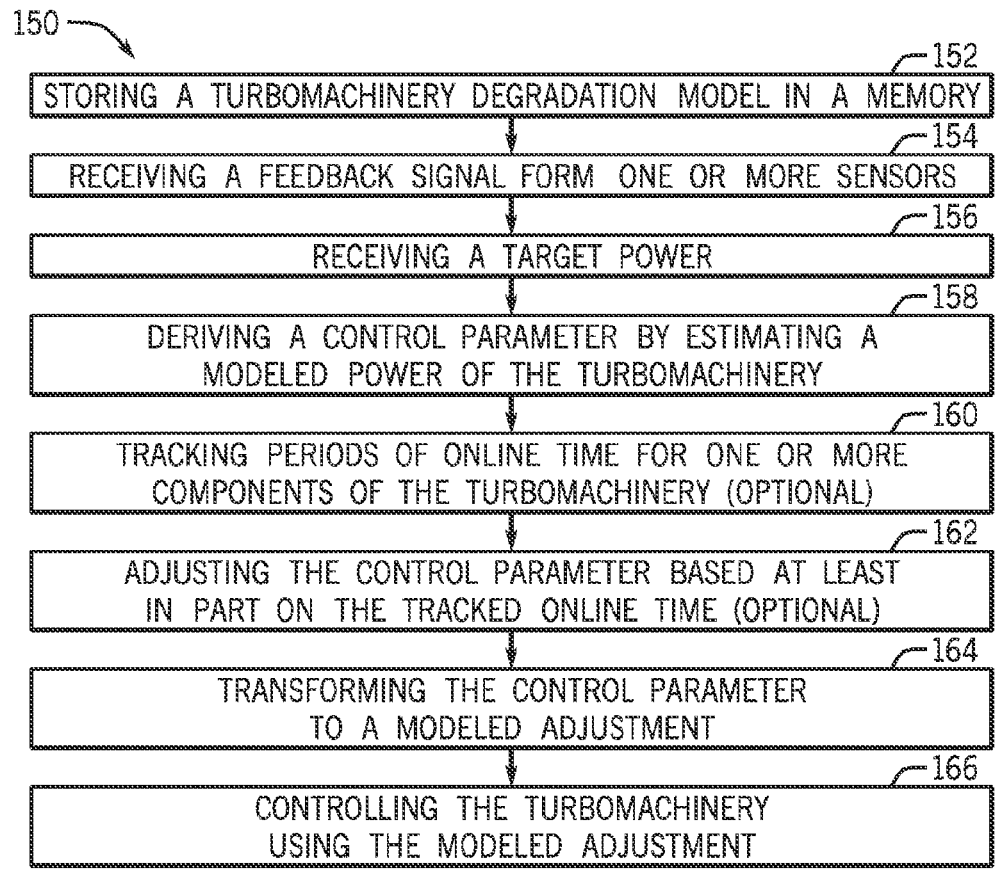
FIG. 5 is a flow chart view of a process that may be used to control the turbine system of FIG. 1.

FIG. 5 is a flow diagram illustrating a process 150 that may be used to control the turbine system 10. The process 150 includes storing a turbomachinery degradation model in a memory (block 152). For example, the TMDM 64 may be stored in the memory 37. The process 150 also includes receiving a feedback signal from one or more sensors (block 154). In certain embodiments, the received feedback signal may be the temperature measurement 122 and/or the heat rate measurement 124 received from the sensors 42 by the controller 38. The process further includes receiving a target power (block 156). In some embodiments, the target power 66 and/or the target heat rate 68 may be received by the controller 38. The controller 38 may then derive a control parameter by estimating a modeled power of the turbomachinery using the turbomachinery model and the target power (block 158). In certain embodiments, the control parameter may include a firing temperature, an inlet guide vane (IGV) angle, a temperature rise, and/or an exhaust temperature. In some embodiments, the controller 38 may track periods of online time for one or more components of the turbomachinery (block 160) and adjust the control parameters based at least in part on the tracked online time and the turbomachinery degradation model (block 162). Additionally, the tracked periods of online time may be used to estimate how one or more components of the turbine system 10 may respond to various control parameters. Furthermore, the tracked periods of time may be used to determine an expected end of life of one or more components of the turbine system 10. Additionally, this tracked period of online time for each of the components may be reset upon maintenance of and/or replacement of the component.

The controller 38 transforms the control parameter to a modeled adjustment (block 164). For example, in some embodiments, the control parameters may be converted to a fuel stroke reference (FSR) system adjustment, an inlet guide vane (IGV) system adjustment, an inlet bleed heat (IBH) system adjustment, and/or a fuel type system adjustment. Furthermore, the controller 38 then may utilize the modeled adjustments to control the turbine system 10 (block 166).

Technical effects of the invention include enabling the prioritization of a target power, target heat rate, and/or efficiency goal to enable the achievement of multiple objectives in operating a power plant. By enabling a user to prioritize objectives, the desired goals may be achieved while providing enhancement of other goals that are still possible when the prioritized objective is achieved. By providing the user with multiple objectives that may be performed at once, the user has more control over a variety of different operating goals and may be able to achieve a first goal, while enabling a user to enhance the efficiency of another objective while achieving a goal of the prioritized objective.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
a memory storing a turbomachinery degradation model configured to model degradation of a turbomachinery over time; and
a controller communicatively coupled to the memory and configured to control the turbomachinery based on a feedback signal and the turbomachinery degradation model, wherein the turbomachinery degradation model comprises a physics-based model that simulates physics of the turbomachinery and is configured to predict a loss of efficiency for the turbomachinery, and the turbomachinery degradation model is configured to use a target power to derive a control parameter by estimating a modeled power of the turbomachinery, and wherein the controller is configured to use the control parameter to control the turbomachinery, wherein the target power comprises a selected desired power to be produced by the turbomachinery.

2. The system of claim 1, wherein the controller is configured to transform the control parameter into a fuel stroke reference (FSR) system adjustment, an inlet guide vane (IGV) system adjustment, an inlet bleed heat (IBH) system adjustment, a fuel type system adjustment, or a combination thereof, and to use the FSR system adjustment, the IGV system adjustment, the IBH system adjustment, the fuel type system adjustment, or a combination thereof, for control of the turbomachinery.

3. The system of claim 1, wherein the control parameter comprises a firing temperature, an inlet guide vane (IGV) angle, a combustor temperature rise, an exhaust temperature, or a combination thereof.

4. The system of claim 1, wherein the turbomachinery degradation model is configured to use a target heat rate and the target power to derive the control parameter by estimating the modeled power and a modeled heat rate of the turbomachinery.

5. The system of claim 1, wherein the controller is configured to use a preservation mode to derive a prioritized list of components of the turbomachinery based on an estimated life of the components of the turbomachinery and to use the prioritized list during control of the turbomachinery, an emissions mode to reduce at least one emission type produced by the turbomachinery, a fuel conservation mode to prioritize a reduction of fuel consumption of the turbomachinery, a power production mode to prioritize the production of a desired range of power by the turbomachinery, or a combination thereof.

6. The system of claim 5, comprising a graphical user interface communicatively coupled to the controller and having a plurality of graphical controls configured to select one or more options for the preservation mode, the emissions mode, the fuel conservation mode, the power production mode, or a combination thereof.

7. The system of claim 1, wherein the turbomachinery degradation model is configured to substantially satisfy a plurality of constraints comprising a time to outage constraint, an emissions constraint, a fuel cost constraint, a maintenance interval constraint, a regulatory constraint, an economic constraint, or a combination thereof.

8. The system of claim 1, wherein the turbomachinery degradation model comprises a physics-based model, a statistical model, a heuristic model, or a combination thereof.

9. The system of claim 1, wherein the turbomachinery comprises a gas turbine, a steam turbine, a hydroturbine, a wind turbine, or a combination thereof.

10. The system of claim 1, comprising a sensor communicatively coupled to the controller and configured to transmit the feedback signal, and wherein the feedback signal is representative of a measured power, a measured heat rate, or a combination thereof.

11. A method, comprising:
storing a turbomachinery degradation model in a memory, wherein the turbomachinery degradation model is configured to model degradation of a turbomachinery over time, wherein the turbomachinery degradation model comprises a physics-based model that simulates physics of the turbomachinery and is configured to predict a loss of efficiency for the turbomachinery;
receiving a feedback signal from one or more sensors;
receiving a target power, wherein the target power comprises a selected desired power to be produced;
deriving a control parameter by estimating a modeled power of the turbomachinery using the turbomachinery degradation model and the target power;
transforming the control parameter to a modeled adjustment; and
controlling the turbomachinery using the modeled adjustment.

12. The method of claim 11, wherein transforming the control parameter comprises transforming the control parameter into a fuel stroke reference (FSR) system adjustment, an inlet guide vane (IGV) system adjustment, an inlet bleed heat (IBH) system adjustment, a fuel type system adjustment, or a combination thereof; and controlling the turbomachinery comprises using the FSR system adjustment, the IGV system adjustment, the IBH system adjustment, the fuel type system adjustment, or a combination thereof.

13. The method of claim 11, comprising using a model predictive controller for online enhancement for controlling the turbomachinery and for providing a model-predictive graphical user interface.

14. The method of claim 11, comprising:
tracking periods of online time for one or more components of the turbomachinery; and
adjusting the control parameter based at least in part on the tracked online time and the turbomachinery degradation model.

15. The method of claim 14, comprising resetting the periods of online time after the one or more components undergo maintenance or are replaced.

16. A controller, comprising:
at least one processor adapted to execute instructions configured to cause the controller to:
access a turbomachinery degradation model in a memory, wherein the turbomachinery degradation model is configured to model degradation of a turbomachinery over time, wherein the turbomachinery degradation model comprises a physics-based model that simulates physics of the turbomachinery and is configured to predict a loss of efficiency for the turbomachinery;
receive a feedback signal from one or more sensors;
receive a target power, wherein the target power comprises a selected desired power to be produced by the turbomachinery;
derive a control parameter by estimating a modeled power of the turbomachinery using the turbomachinery degradation model and the target power;
transform the control parameter to a modeled adjustment; and
control the turbomachinery using the modeled adjustment.

17. The controller of claim 16, wherein the control parameter comprises a firing temperature, an inlet guide vane (IGV) angle, a combustor temperature rise, an exhaust temperature, or a combination thereof.

18. The controller of claim 17, wherein transforming the control parameter comprises transforming the control parameter into a fuel stroke reference (FSR) system adjustment, an inlet guide vane (IGV) system adjustment, an inlet bleed heat (IBH) system adjustment, a fuel type system adjustment, or a combination thereof; and controlling the turbomachinery comprises using the FSR system adjustment, the IGV system adjustment, the IBH system adjustment, the fuel type system adjustment, or a combination thereof.

19. The controller of claim 18, wherein the instructions are configured to use a preservation mode to derive a prioritized list of components of the turbomachinery based on an estimated life of the components of the turbomachinery and to use the prioritized list during control of the turbomachinery, an emissions mode to reduce at least one emission type produced by the turbomachinery, a fuel conservation mode to prioritize a reduction of fuel consumption of the turbomachinery, or a power production mode to prioritize the production of a desired range of power by the turbomachinery, or a combination thereof.

20. The controller of claim 19, wherein the instructions are configured to display via a graphical user interface coupled to the processor, a plurality of graphical controls configured to select one or more options for the preservation mode, the emissions mode, the fuel conservation mode, the power production mode, or a combination thereof.

\* \* \* \* \*